United States Patent [19]

Leisner

[11] 4,394,007
[45] Jul. 19, 1983

[54] DEBURRING CHAMBER FOR THERMAL DEBURRING

[75] Inventor: Ernst Leisner, Ditzingen, Fed. Rep. of Germany

[73] Assignee: Robert Bosch GmbH, Stuttgart, Fed. Rep. of Germany

[21] Appl. No.: 253,843

[22] PCT Filed: Jul. 16, 1980

[86] PCT No.: PCT/EP80/00056
§ 371 Date: Apr. 23, 1981
§ 102(e) Date: Apr. 23, 1981

[87] PCT Pub. No.: WO81/00819
PCT Pub. Date: Apr. 2, 1981

[30] Foreign Application Priority Data

Sep. 27, 1979 [DE] Fed. Rep. of Germany ... 7927450[U]

[51] Int. Cl.³ ............................. C21D 9/00; B23K 7/00
[52] U.S. Cl. ..................................... 266/249; 148/9 R
[58] Field of Search ................. 266/48, 249, 250, 251, 266/252; 148/9 R

[56] References Cited
U.S. PATENT DOCUMENTS

Re. 29,408  9/1977  Geen et al. .......................... 148/9 R
1,186,162   6/1916  Bauer ................................. 148/9 R
3,645,521   2/1972  Geen et al. .......................... 266/249
3,901,488   8/1975  Riddle ................................. 266/249
4,025,062   5/1977  Johnstone et al. .

FOREIGN PATENT DOCUMENTS 7525557  8/1975  France .

Primary Examiner—W. Stallard
Attorney, Agent, or Firm—Frishauf, Holtz, Goodman & Woodward

[57] ABSTRACT

A thermal deburring chamber has interchangeable inner parts exposed to wear backed by permanent parts providing support and cooling. The inner parts fit so as to permit some expansion without transmitting excessive thermal or mechanical shock to the backing members.

8 Claims, 1 Drawing Figure

U.S. Patent  Jul. 19, 1983  4,394,007
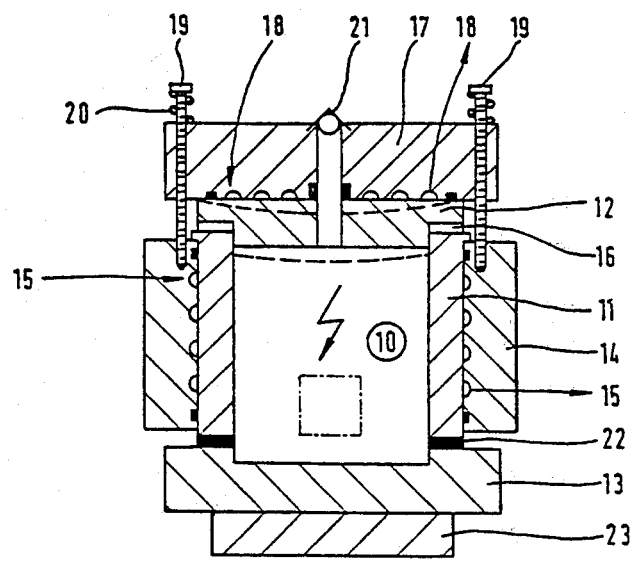

DEBURRING CHAMBER FOR THERMAL DEBURRING

STATE OF THE ART

In thermal deburring (also called thermochemical deburring), the pieces of work to be deburred are introduced into a deburring chamber. Combustion gas and oxygen are introduced into the deburring chamber via metering valves. The gas mixture is ignited in the chamber by an electric ignition device. When hydrogen is used as the combustion gas, the combustion produces water while releasing heat. The procedure runs its course within a few milliseconds. As a result of the heat being released, temperatures of approximately 3,000° C. occur in the chamber. After the pieces of work have been deburred, the deburring chamber is opened and the pieces of work are replaced with new pieces of work which are to be deburred.

The thermal deburring process causes an intentional removal of the material of which the work piece to be deburred is made, particularly at the edges. However, it is disadvantageous that there is also an unintended removal of material at the surfaces or portions of the deburring chamber forming its inner wall, this unintended removal being locally quite variable in severity.

THE INVENTION

Briefly, in order to deal more effectively with the erosion of the chamber, the chamber walls are made easily interchangeable and are designed subject to considerable wear.

The deburring chamber according to the invention has the advantage over the prior art that tool costs in thermal deburring can be greatly reduced. Because parts of the deburring chamber which are subject to differing amounts of wear are embodied separately, relatively small units can be exchanged very easily and quickly. Since the deburring chambers operate with considerable cycling times (20 seconds, for instance), the deburring chamber walls are exposed to severe alternating thermal stresses, which can cause rupturing because of thermal shock and thus can cause a severe reduction in long-term rupture strength. The inner walls of the deburring chamber are subjected to a continuous alternating stress in synchronism with the cycle. The removal of material from deburring chamber parts can be of an order of magnitude of up to one millimeter per 50,000 deburring cycles.

In this area, the deburring chamber according to the invention is therefore made up of easily exchangeable units which are subjected to relatively high wear. Such units are, in particular, the interior walls of the deburring chamber.

A particularly advantageous deburring chamber design comprises an interior deburring chamber ring or sleeve with an upper portion or ceiling of the deburring chamber adapted thereto and an associated closing bottom plate. These three parts, adapted to one another, define the interior of the deburring chamber and represent those parts which are most subjected to wear.

The inner parts of the deburring chamber are embodied, in terms of their strength, in such a manner that they are independently capable of withstanding the stresses which occur during thermal deburring. To this end, a clearance fit is provided between the inner deburring chamber ring and the outer cooling ring, in order to limit the continuous alternating temperature stress and accordingly the reduced long-term rupture strength to the part subject to wear. This principle is also applied to the upper portion of the deburring chamber, which when cold has a slightly inwardly curved shape but under temperature stress has a locking fit with the adapter located above it. However, a further form of embodiment of the deburring chamber provides that the inner ring is fitted into the surrounding cooling ring or some additional ring in such a manner that the surrounding ring absorbs the forces, while the inner ring is selected with a view solely to the factor of wear.

DRAWING

One exemplary embodiment of the invention is shown in the drawing and described in detail, with further advantages being discussed, in the following description. The FIGURE is a schematic representation of a deburring chamber which does not include the associated machine frame.

DESCRIPTION OF THE PREFERRED EMBODIMENT

The deburring chamber 10 is defined by an inner sleeve-like ring 11 of the deburring chamber, an upper deburring chamber portion 12 and a closing plate 13, all serving as walls of the deburring chamber. The inner chamber ring 11 is surrounded by a cooling sleeve-like ring 14 having cooling coils 15. The ratio of the wall thickness of the inner ring to that of the cooling ring 14 is 2:3, by way of example. Because of the relative thinness of the walls of the inner portions of the deburring chamber, a large temperature drop in the walls is prevented from occurring. This results in a considerable reduction in thermal stress. The long-term rupture strength of the parts can thus be substantially increased. The cooling ring 14, like the inner ring 11, is manufactured of a chrome-nickel steel and embodied as a rupture safety device. The clearance fit between the inner ring 11 and the cooling ring 14 assures that no stresses occurring during the course of operation can be transmitted from the inner ring to the cooling ring. The cooling ring is accordingly not subjected to any alternating stress and is therefore not subject to wear; as a result, it can be used for safety purposes as a means of rupture prevention.

Toward the top, the deburring chamber 10 is bounded by an upper deburring chamber portion 12. A seal 16 is disposed between the upper portion 12 and the inner ring 11 in such a manner that it is not exposed to direct temperature stress. An adapter or backing plate 17 is adapted to the upper deburring chamber portion 12. The upper adapter 17 is embodied similarly to the cooling ring 14. To this end, it is provided with cooling coils 18, which assume the function of cooling the upper portion 12 of the deburring chamber. In order not to subject the upper adapter 17 to alternating temperature stress (it is not a part subject to wear), the upper portion 12 of the deburring chamber is embodied in such a manner that when cold it has an inwardly curved shape. The upper portion 12 of the deburring chamber expands only as the result of heating during thermal deburring and then has a locking fit with the upper adapter 17.

The inner ring 11 and the upper portion 12 of the deburring chamber are clamped together by means of a tension bolt connection 17 between the upper adapter 17 and the cooling ring 14. The connection is prestressed by springs 20 in order to compensate for tolerances, expansion and the settling of the seal 16. The deburring chamber is supplied with combustion gas and oxygen by means of the gas connection 21.

In its lower portion, the deburring chamber 10 is defined by the closing plate 13, which is connected with the inner deburring chamber ring 11 by means of a seal 22. A further lower adapter or backing plate 23, like the upper adapter or backing plate 17, assumes the function of connection to the machine frame, not shown in the drawing.

I claim:

1. A chamber for thermal deburring of work pieces comprising readily replaceable parts (11,12,13) fitting together to provide respectively the internal lateral, tip and bottom walls of said chamber and more permanent backing parts (17,15,23) assuring support and shock-resisting integrity for the chamber.

2. A deburring chamber as defined in claim 1, in which said readily replaceable parts comprise an inner sleeve-like ring (11) encircling the enclosed space of the chamber, an inner top cover (12) fitting on the ring and an inner bottom cover fitting the ring.

3. A deburring chamber as defined in claim 2, in which the fit of said inner top cover (12) to said ring (11) is of such shape that some deformation of said top cover without loss of fit to the ring is possible by internal pressure.

4. A deburring chamber as defined in claim 2, in which said backing parts include a cooling sleeve-like ring (14) surrounding said inner ring (11) and providing a clearance fit between said inner and cooling rings.

5. A deburring chamber is defined in claim 4, in which said backing parts include an adapter (17) above said inner top cover equipped for cooling said top cover and having a connection (18) for circulation of a coolant medium, said adapter (17) providing a supporting transition to a machine frame.

6. A deburring chamber as defined in claim 5, in which prestressed tension bolts (19) are provided for connecting said adapter (17) with cooling sleeve-like rings (14).

7. A deburring chamber as defined in claim 5, in which the lower surface of said adapter (17), being provided for abutment of said top cover (12) under internal pressure, has a concave shape.

8. A deburring chamber as defined in claim 2, in which said readily replaceable parts are made of materials chosen for wear and erosion resistance while said backing parts are made of materials chosen for withstanding forces generated by pressure and shock in the course of deburring operations.

* * * * *